United States Patent [19]

Enomoto et al.

[11] Patent Number: 6,002,455
[45] Date of Patent: *Dec. 14, 1999

[54] DIGITAL DATA TRANSFER APPARATUS USING PACKETS WITH START AND END SYNCHRONIZATION CODE PORTIONS AND A PAYLOAD PORTION

[75] Inventors: Mitsutaka Enomoto, Kanagawa; Yoshio Kamiura, Tokyo, both of Japan

[73] Assignee: Sony Corporation, Tokyp, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/111,339

[22] Filed: Jul. 7, 1998

Related U.S. Application Data

[63] Continuation of application No. 08/624,560, Jul. 1, 1996, Pat. No. 5,923,384.

[30] Foreign Application Priority Data

Aug. 12, 1994 [JP] Japan .................................. 6-190750

[51] Int. Cl.[6] ...................................................... H04N 7/24
[52] U.S. Cl. ..................................... 348/845.2; 348/845.3
[58] Field of Search .................................... 348/705, 385, 348/388, 845.2, 426, 390, 465, 722, 845.3; 370/400, 474, 469, 345, 476

[56] References Cited

U.S. PATENT DOCUMENTS

| 5,365,520 | 11/1994 | Wang et al. | 370/352 |
| 5,483,287 | 1/1996 | Siracusa et al. | 348/845 |
| 5,831,690 | 11/1998 | Lyons et al. | 348/845.2 |
| 5,867,230 | 2/1999 | Wang et al. | 348/845 |
| 5,872,784 | 2/1999 | Rostoker | 370/395 |
| 5,874,995 | 2/1999 | Naimpally et al. | 348/384 |

*Primary Examiner*—Victor R. Kostak
*Attorney, Agent, or Firm*—Frommer Lawrence & Haug, LLP.; William S. Frommer

[57] ABSTRACT

A digital data transmission apparatus which can suitably route and transmit to a desired apparatus two types of digital data, that is, digital data of a serial digital interface (SDI) format and a serial digital data interface (SDDI) format having a partially common format to the SDI format even if they are mixed, the digital data transmission apparatus having a first routing apparatus (20, 20A) having a first signal supplier (102) for supplying the data of a first transmission packet of the SDI format; a second signal supplying means (104) for supplying data of a second transmission packet of the SDDI format having a common control data portion to that of the SDI format and having the same data length; a first input terminal receiving the data of the first transmission packet; and a second input terminal receiving the data of the second transmission packet and outputs the first input data supplied to the first input terminal from the first output terminal and outputs the second data supplied to the second input terminal from the second output terminal based on the set routing information.

12 Claims, 11 Drawing Sheets

FIG. 1A
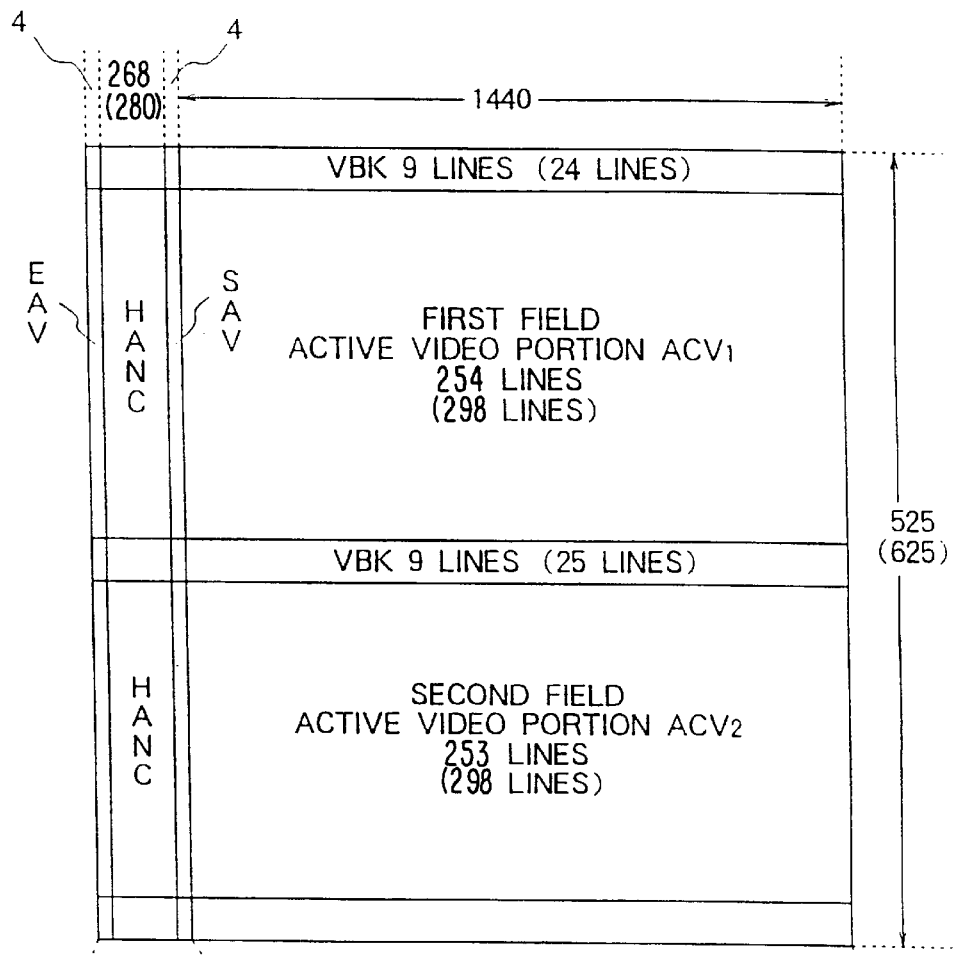
FIG. 1B
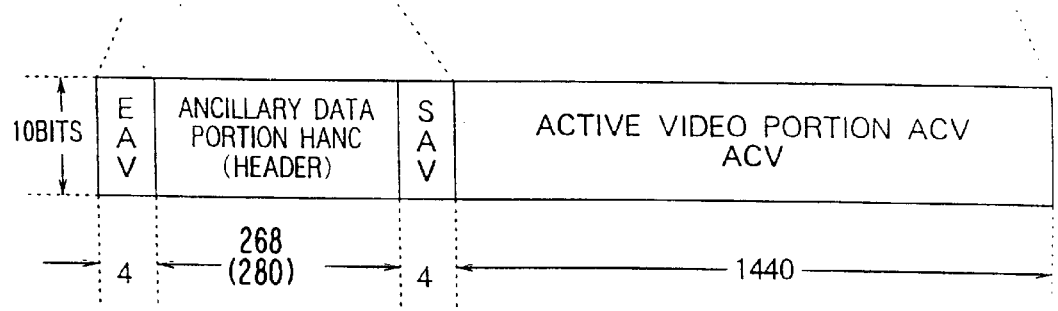
TRANSMISSION SPEED 270 MBPS SERIAL

FIG. 2A
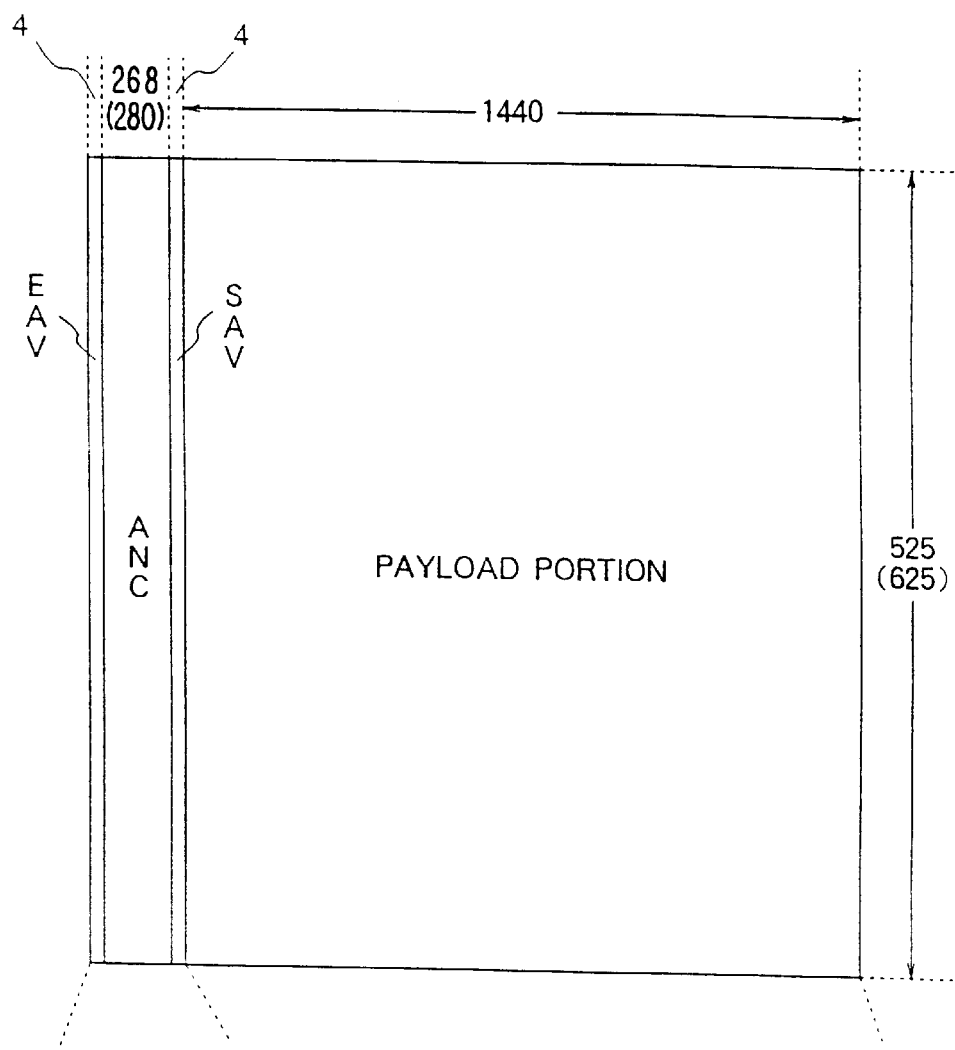
FIG. 2B
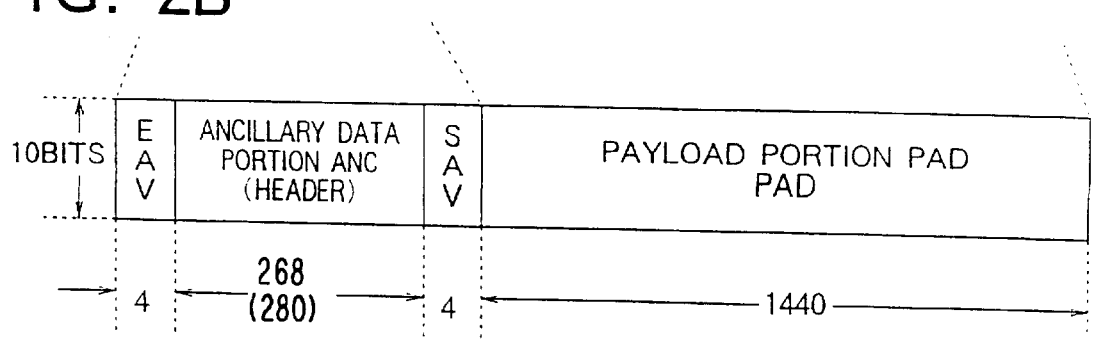
TRANSMISSIONSPEED : 270 MBPS SERIAL

ated in the SMPTE-295M
DIGITAL DATA TRANSFER APPARATUS USING PACKETS WITH START AND END SYNCHRONIZATION CODE PORTIONS AND A PAYLOAD PORTION This is a continuation of Ser. No. 08/624,560 filed Jul. 1, 1996, which is a 371 of PTC/IP95/01615, filed Aug. 14, 1995.

TECHNICAL FIELD

The present invention relates to a digital data transmission apparatus which can transmit any of a plurality of digital data partially having a common format but having different formats as a whole to a desired apparatus by performing routing (switching), more specifically relates to a digital data transmission apparatus which preferably performs routing and can transmit to a desired apparatus even if two types of digital data, i.e., digital data of a serial digital interface (SDI) system and digital data of serial digital data interface (SDDI, trademark of Sony Corporation) having a partially common format to that of the SDI system are mixed.

BACKGROUND ART

In television broadcasting stations etc., the video tape recording (VTR) apparatuses, video editing apparatuses, etc. used for the editing of videos are connected via a routing apparatus. A digital video signal and an audio video signal transmitted from any apparatus are input to a desired other apparatus via the routing apparatus and used for editing etc.

The routing apparatus selects a signal which has been input to a specific input terminal of a plurality of input terminals and outputs it to any output terminal of a plurality of output terminals. That is, the routing apparatus acts as a switching apparatus which outputs a certain input signal to any output terminal to which a specific apparatus is connected. This switching operation is called the routing of the routing apparatus.

As the transmission format for transmitting a digital video signal and a digital audio signal (hereinafter, the digital video signal and the digital audio signal are referred to overall as digital data or a digital AV signal) between editing apparatuses used for the editing of the video signal etc., the serial digital interface (SDI) format has been known.

The SDI format is standardized in the SMPTE-295M standard of the SMPTE (Society of Motion Picture and Television Engineering).

This SMPTE-2 standard is basically a signal standard for the D1 format or D2 format which are the standards of digital signals. Accordingly, a signal of the SDI format is also used for transmission as a digital AV signal of the D1 format or D2 format. The transmission speed (transmission frequency) of the signal of the SDI format is a high speed, i.e., 270 MHz. However, for standardization, the amount of a signal of the SDI format which can be transmitted is restricted to only one channel's worth of the digital video signal and further restricted to only eight channels' worth of the base band audio signal. For this reason, when using an SDI signal, the user sometimes encounters the limits of transmission. A signal of the SDI format is not always suitable for meeting with the demands of multimedia or multi-channels which are now growing in the field of broadcasting or editing of videos.

Therefore, the assignee of the present application has proposed a novel format of digital data which is not only suitable for the multimedia or multi-channel while making active use of the advantages of the SDI format and maintaining partial commonality with the SDI format, but is also suitable for transmission in a data communication system such as a local area network (LAN), Ether Net, or Token Ring (for example, refer to Japanese Patent Application No. 6-144403 entitled "Digital Signal Transmission Method, Digital Signal Transmission Apparatus and Receiving Apparatus, and Transmitting and Receiving Apparatus" filed before the Japanese Patent Office on Jun. 27, 1994). This new transmission format proposed by the present assignee is referred to as the "serial digital data interface (SDDI)" format. Details of this SDDI format (trademark of Sony Corporation) will be explained later.

As the digital AV signal in the editing process of a television broadcasting station etc., there is a case where a signal of the SDI format and a signal of the SDDI format are mixed. Accordingly, it is necessary to suitably route these mixed signals of the SDI format and SDDI format in the routing apparatus to transmit the data to the intended editing apparatus and, at the same time, necessary to perform the editing using the signal of the SDI format and the signal of the SDDI format with a good efficiency.

DISCLOSURE OF THE INVENTION

A first object of the present invention is to provide a digital data transmission apparatus having a routing apparatus which can effectively perform routing for a signal of the SDI format and a signal of the SDDI format with a simple circuit configuration in a signal processing system in which these signals are mixed.

A second object of the present invention is to provide a digital data transmission apparatus having a conversion device which can perform conversion between the signal of the SDI format and the signal of the SDDI format with a simple circuit configuration.

A third object of the present invention is to provide a digital data transmission apparatus which can suitably route a signal of the SDI format and a signal of the SDDI format and further has a conversion device which can perform conversion between the signal of the SDI format and the signal of the SDDI format with a high efficiency.

A fourth object of the present invention is to provide a data transmission apparatus using a transmission packet of a format suitable for an ATM exchange system not restricted to a signal of the SDI format and a signal of the SDDI format.

According to the present invention, there is provided a digital data transmission system including: a first signal supplying means comprising an end-of-active-video code (EAV) portion, an ancillary data portion, a start-of-active-video code (SAV) portion, and an active video portion and supplying data of a first transmission packet of the SDI format; a second signal supplying means for supplying data of a second transmission packet of the SDDI format, having an equal transmission packet size to that of the SDI format and in which the EAV portion, ancillary data portion, and the SAV portion are arranged at the same positions as those of the SDI format and in which a payload portion wherein data to be transmitted is stored is arranged at the same position as that for the active video portion of the SDI format; and a first routing apparatus including, at least, a first input terminal to which at least the data of the first transmission packet is input, a second input terminal to which the data of the second transmission packet is input, a first output terminal, and a second output terminal, and outputting the data of the first transmission packet input to the first input terminal and the data of the second transmission packet supplied to the second input terminal to the first output terminal and the second output terminal in accordance with control data.

Preferably, it further has a setting means which supplies the control data to the first routing apparatus.

Also, preferably, the first routing apparatus can change the number of input terminals and number of output terminals for the data of the first transmission packet and the number of input terminals and number of output terminals for the data of the second transmission packet based on the control data supplied from the setting means.

Preferably, it further has a data conversion device which is connected to one output terminal of the first routing apparatus and converts the data of the second transmission packet to the data of the first transmission packet.

Preferably, it further has a second data conversion device which is connected to one output terminal of the first routing apparatus and converts the data of the first transmission packet to the data of the second transmission packet.

Preferably, the data of the first transmission packet and the data of the second transmission packet contain video data and provision is further made of a monitor provided with a conversion means which is connected to one output terminal of the first routing apparatus and converts the data of the second transmission packet to the data of the first transmission packet.

Preferably, the data of the first transmission packet and the data of the second transmission packet contain video data and provision is further made of a monitor which is connected to one output terminal of the first routing apparatus and displays the video based on the input data based on the format of the data of the first transmission packet.

Preferably, it further has a video signal processing device which is connected to one output terminal of the first routing apparatus and applies signal processing to the data of the first transmission packet or the data of the second transmission packet.

Preferably, the video signal processing device comprises an editing device which performs editing with respect to the data of the first transmission packet or the data of the second transmission packet.

Preferably, the data of the first transmission packet and the data of the second transmission packet contain video data and provision is further made of a video signal processing device which is connected to one output terminal of the first routing apparatus and the first data conversion device and applies signal processing to the data of the first transmission packet supplied from one output terminal of the first routing apparatus and the first data conversion device.

Preferably, the data of the first transmission packet and the data of the second transmission packet contain video data and provision is further made of a video signal processing device which is connected to one output terminal of the first routing apparatus and the second data conversion device and applies signal processing to the data of the second transmission packet supplied from one output terminal of the first routing apparatus and the second data conversion device.

Preferably, it further has a second routing apparatus which has a first signal processing device connected to the first output terminal of the first routing apparatus; a second signal processing device connected to the second output terminal of the first routing apparatus; a first input terminal to which at least the data output from the first signal processing device is supplied; a second input terminal to which the data output from the second signal processing device is supplied; and at least first and second output terminals and outputs the data supplied to the first and second input terminals from the first and second input terminals.

Preferably, it further has a signal route connecting one output terminal of the second routing apparatus and one input terminal of the first routing apparatus.

Specifically, the data of the first packet contains a video signal and header data containing identification data indicating the first packet, while the data of the second packet contains a video signal and header data containing identification data indicating the second packet.

Also, according to the present invention, there is provided a digital data transmission apparatus having a routing means which has a first data supplying means for supplying first data comprised by a first transmission packet which has a control portion containing at least the data for the transmission control and a data portion containing the transmission data to be transmitted and wherein the control portion and the data portion are separated by a predetermined separating code; a second data supplying means for supplying second data comprised by a second transmission packet which has a control portion containing at least the data for the transmission control and a part containing the transmission data of a fixed data length or a variable data length to be transmitted and wherein the control portion and the data portion have the same configurations as those of the first transmission packet; a plurality of input terminals; and one or more output terminals and outputs the first transmission packet or the second transmission packet respectively input to the plurality of input terminals from a desired output terminal and having a data receiving means for receiving the first transmission packet or the second transmission packet from the output terminal of the routing means.

Preferably, the control portion of the second transmission packet contains at least identification data indicating the second transmission packet and structural data indicating the structure of the data portion of the second transmission packet while the data portion of the second transmission packet contains a sectioning code for dividing into sections a plurality of transmission data contained in this data portion and type data indicating the type of each of the plurality of transmission data contained in the data portion.

Specifically, the control portion of the second transmission packet and the control portion of the first transmission packet have the same data length, while the data portion of the second transmission packet and the data portion of the first transmission packet have the same data length.

BRIEF DESCRIPTION OF THE DRAWINGS

The above objects and features of the present invention and other objects and features will become clearer from the following description made in relation to attached drawings, wherein:

FIG. 1A is a view of the SDI format;

FIG. 1B is a view of the structure of a transmission packet of the SDI format illustrated in FIG. 1A;

FIG. 2A is a view of the SDDI format;

FIG. 2B is a view of the structure of a transmission packet of the SDDI format illustrated in FIG. 2A;

BEST MODE FOR CARRYING OUT THE INVENTION

Figure 3A:
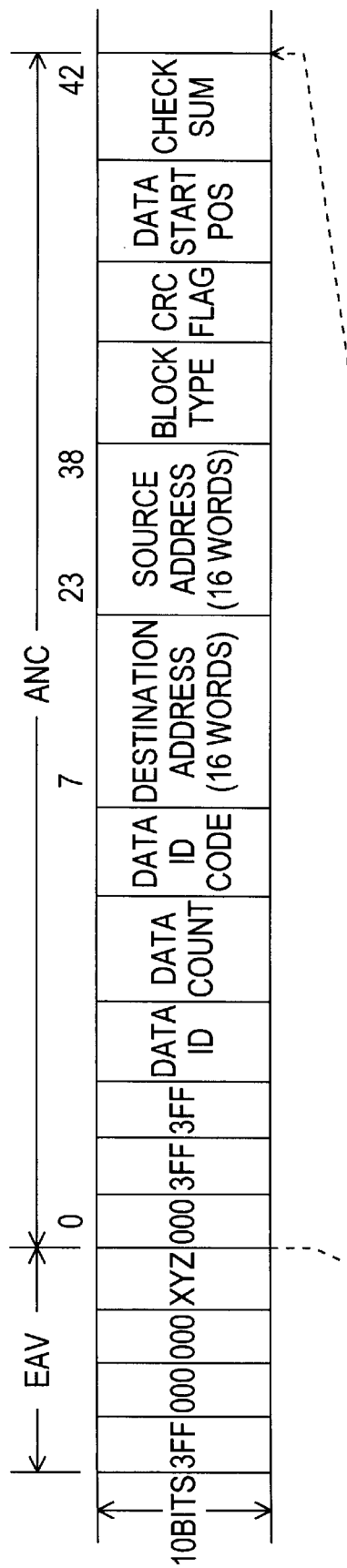
FIG. 3A is a view of the structure of the data contained in an ancillary data portion ANC of the transmission packet of the SDDI format shown in FIG. 2B, particularly a header.

Before explaining the preferred embodiments of the digital data transmission apparatus of the present invention, details of the transmission format of the serial digital interface (SDI) system and the transmission format of the serial digital data interface (SDDI) system will be explained.

SDI format

FIG. 1A is a view of the overall structure of a frame of a video signal of the SDI format; and FIG. 1B is a view of the structure of a transmission packet of the SDI format.

In the case of a video signal of the NTSC 525 system, a digital video signal of the SDI format consists of (4+268+4+1440)=1716 words and 525 lines in a vertical direction with 10 bits/word per line. Also, in the case of a video signal of the PAL 625 system, a digital video signal of the SDI format consists of (4+280+4+1440)=1728 words in a horizontal direction and 625 lines in the vertical direction with 10 bits/word per line. In the figure, numerals in parentheses indicate figures for the video signals of the PAL 625 system, and numerals without parentheses indicate figures for the video signals of the NTSC 525 system.

EAV: End-of-active-video code

In each line, the four words from the first word to the fourth word indicate the end of the active video portion ACV and are used as the region in which the EAV (end-of-active-video) code which separates the ancillary data portion ANC mentioned later is stored. The four-word code EAV is 3FF, 000, 000, XYZ (any data) by hexadecimal notation.

HANC: Horizontal ancillary data portion

In each line, the 268 words from the fifth word to the 272-nd word in the case of the NTSC 525 system and the 280 words from the fifth word to the 284-th word in the case of the PAL 265 system are used as the horizontal ancillary data portion ANC in which the header, auxiliary data, audio data, etc. are stored.

SAV: Start-of-active-video code

In each line, the words from the 273-rd word to the 276-th word in the case of the NTSC 525 system and the four words from the 285-th word to the 288-th word in the case of the PAL 265 system indicate the start of the active video portion ACV and store a start-of-active-video code SAV which separates the ancillary data portion ANC. The four-word code SAV is 3FF, 000, 000, XYZ (any data) by hexadecimal notation. That is, EAV and SAV are the same data for the first three words.

ACV: Active video portion

In both of the case of the NTSC 525 system and PAL 625 system, the same number of words, i.e., 1440 words, of the active video portion ACV is provided in the horizontal direction. The video signal is stored here. In the active video portion ACV, a size of the same 1440 words is secured, i.e., the 277-th word to 1716-th word in the case of the NTSC 525 system and the 289-th word to 1728-th word in the case of the PAL 625 system.

VBK: Vertical blanking portion

Five hundred twenty-five lines (in the case of the NTSC 525 system) and 625 lines (in the case of the PAL 625 system) are roughly divided into two regions.

The 9 lines from the first line to the ninth line in the case of the NTSC 525 system and the 24 lines from the first line to the 24-th line in the case of the PAL 625 system are used as a first vertical blanking portion VBK storing the blanking signals in the vertical direction.

Also, the 9 lines from the 264-th line to 273-rd line in the case of the NTSC 525 system and the 25 lines from the 323-rd line to 348-th line in the case of the PAL 625 system are used as a second vertical blanking portion VBK storing the blanking signals in the vertical direction.

ACV: Active video portion

In the case of the NTSC 525 system, the 10-th line to 263-rd line (10+244=254 lines) are used as a first field of an active video portion $ACV_1$; and the (10+243=) 253 lines from the 273-rd line to 525-th line are used as a second field of an active video portion $ACV_2$. In the case of the NTSC 525 system, the size of the first field of the active video portion $ACV_1$ becomes 1440 words×254 lines=365,760 words, and the size of the second field of the active video portion $ACV_2$ becomes 1440 words×253 lines=364,320 words.

In the case of the PAL 625 system, the 25-th line to 322-nd line (10+288=298 lines) are used as the first field of the active video portion $ACV_1$ and the (10+288=) 298 lines from 348-th line to 625-th line are used as the second field of the active video portion $ACV_2$. In the case of the PAL 625 system, the size of the first field of the active video portion $ACV_1$ becomes 1440 words×298 lines=429,120 words, and the size of the second field of the active video portion $ACV_2$ becomes 1440 word×298 lines=429,120 words.

The signal of SDI format mentioned above is converted to a serial transmission signal of 270 Mbps and transferred between devices such as editing devices.

SDDI format

FIG. 2A is a view of the SDDI format; and FIG. 2B is a view of the structure of a transmission packet of an SDDI signal.

The SDDI format is intended to be applied to the transmission of various types of signals in addition to video signals, but in the present specification, an example of use of the same for the transmission of a video signal will be explained.

Here, in the case of a video signal of the NTSC 525 system, a digital video signal of the SDDI format is composed by (4+268+4+1440)=1716 words in the horizontal direction and 525 lines in the vertical direction with 10 bits/word per line. Also, in the case of the PAL 625 system, a digital video signal of the SDDI format is composed by (4+280+4+1440)=1728 words in the horizontal direction and 625 lines in the vertical direction with 10 bits/word per line. In the figure, numerals in parentheses indicate figures for a video signal of the PAL 625 system, and numerals without parentheses indicate figures for a video signal of the NTSC 525 system.

EAV: End-of-active-video portion

In each line, the four words from the first word to the fourth word indicate the end of the payload portion PAD (portion corresponding to the active video portion ACV of an SDI signal) and is used as a region storing the end-of-active-video code EAV which separates the ancillary data portion ANC mentioned later.

ANC: Ancillary data portion

In each line, the 268 words from the fifth word to the 272-nd word in the case of the NTSC 525 system and the 280 words from the fifth word to the 284-th word in the case of the PAL 625 system are used as the ancillary data portion ANC and store which the header, auxiliary data, etc.

SAV: Start-of-active-video portion

In each line, the four words from the 273-rd word to the 276-th word in the case of the NTSC 525 system and the four words from the 285-th word to the 288-th word in the case of the PAL 625 system indicate the starting of the payload portion PAD (active video portion ACV) and store the start-of-active-video code SAV separating the ancillary data portion ANC.

PAD: Payload portion

Both the capacity in the case of the NTSC 525 system and the capacity in the case of the PAL 625 system are the same. A payload portion PAD of 1440 words is provided in the horizontal direction, and the video signal and audio signal are stored there. In the SDI format, the audio signal was stored only in the ancillary data portion ANC, but it can be stored in the payload portion PAD in the SDDI format.

The payload portion PAD similarly consists of 1440 words from the 277-th word to 1716-th word in the case of the NTSC 525 system and from 289-th word to 1728-th word in the case of the PAL 625 system.

Ancillary data portion ANC and header

Figure 3B:
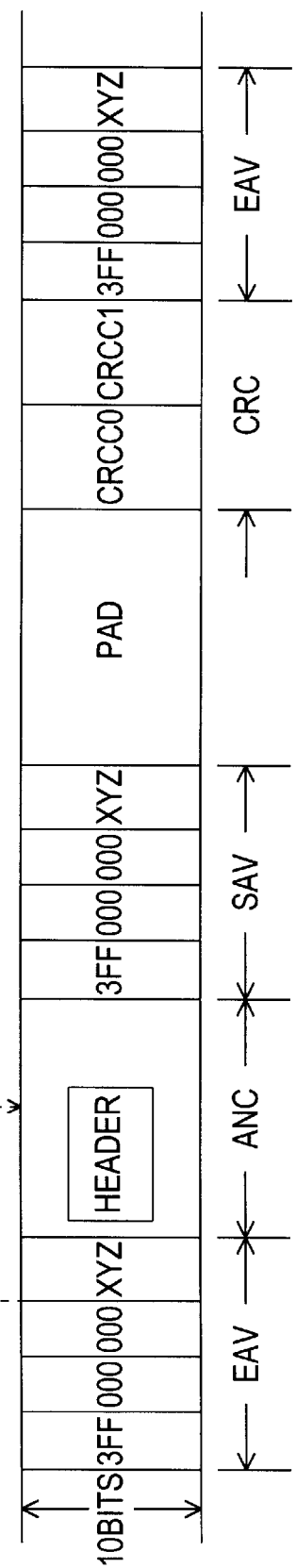
FIG. 3B is a view of the position occupied by the header data shown in FIG. 3A in the ancillary data portion ANC and the surroundings.

FIG. 3A is a view of the data contained in the ancillary data portion ANC of the transmission packet of the SDDI format shown in FIG. 2A and FIG. 2B and particularly indicates the structure of the data of the header (HEADER) contained in the ancillary data portion ANC; while FIG. 3B is a view of the position occupied by the header data in the ancillary data portion ANC.

The end-of-active-video code EAV is comprised by 3FF, 000, 000, XYZ the same as that of the EAV of the SDI format.

After EAV, the ancillary data portion ANC peculiar to the SDDI format continues.

The header data is positioned at the head of the ancillary data portion ANC of the transmission packet of the SDDI format and is comprised of 43 words in total. The items and structure thereof are as follows.

TABLE 1

Structure of Header Portion

Flag of 3 words in total: 000h, 3FFh, 3FFh
(h indicates the hexadecimal notation)
Data of 2 words ID (Data ID)
Data count
Data ID code
Destination address of 16 words
Source address of 16 words
Block type of 1 word
CRC flag of 1 word
Data start position of 1 word
Check sum of 1 word Among the header data in the ancillary data portion ANC of the SDDI format, the flag, data ID, data count, data ID code, and check sum are data common to those of the SDI format. They constitute a transmission packet the same as that of the SDI format, concretely, a frame for transmitting the destination address and the address of originating device.

The data ID indicates that the data which is transmitted by this frame is the destination address and the address of the originating device.

The data count indicates the number of the counted data which should be transmitted.

The data ID code indicates whether that transmission packet thereof is the transmission packet of the SDDI format or the transmission packet for the SDI format. In the case of the SDDI format, as the data ID code, a code indicating the SDDI format is set. Accordingly, when the data ID code is identified, it is seen whether or not it is the SDDI format signal, that is, if it is the SDI format signal.

The destination address and the address of originating device are data which are used for the identification of an apparatus of the destination to which that transmission packet is transmitted and an apparatus which transmitted that transmission packet.

In the block type, data indicating the data structure of the payload portion PAD is contained. Concretely, for example where fixed length data is to be transmitted, it indicates whether the payload portion PAD is made a 1440-word and 1-block structure, a 719-word and 2-block structure, . . . , 5-word and 278-block structure, or variable length data is transmitted, etc. The variable length data is designated by the block type. Where the payload portion PAD contains a plurality of series of data, the end code EAV indicating the end of the respective data, the start code SAV indicating that the next data starts, etc. are inserted between data. At the end of all data, only the end code is added.

The CRC flag indicates whether or not a CRC code has been added to the payload portion PAD of the transmission frame after the payload portion PAD.

The data start position indicates the starting position of the payload portion PAD.

The check sum is used for error detection by the check sum of the data of that frame.

PAD: Payload portion

Figure 4:
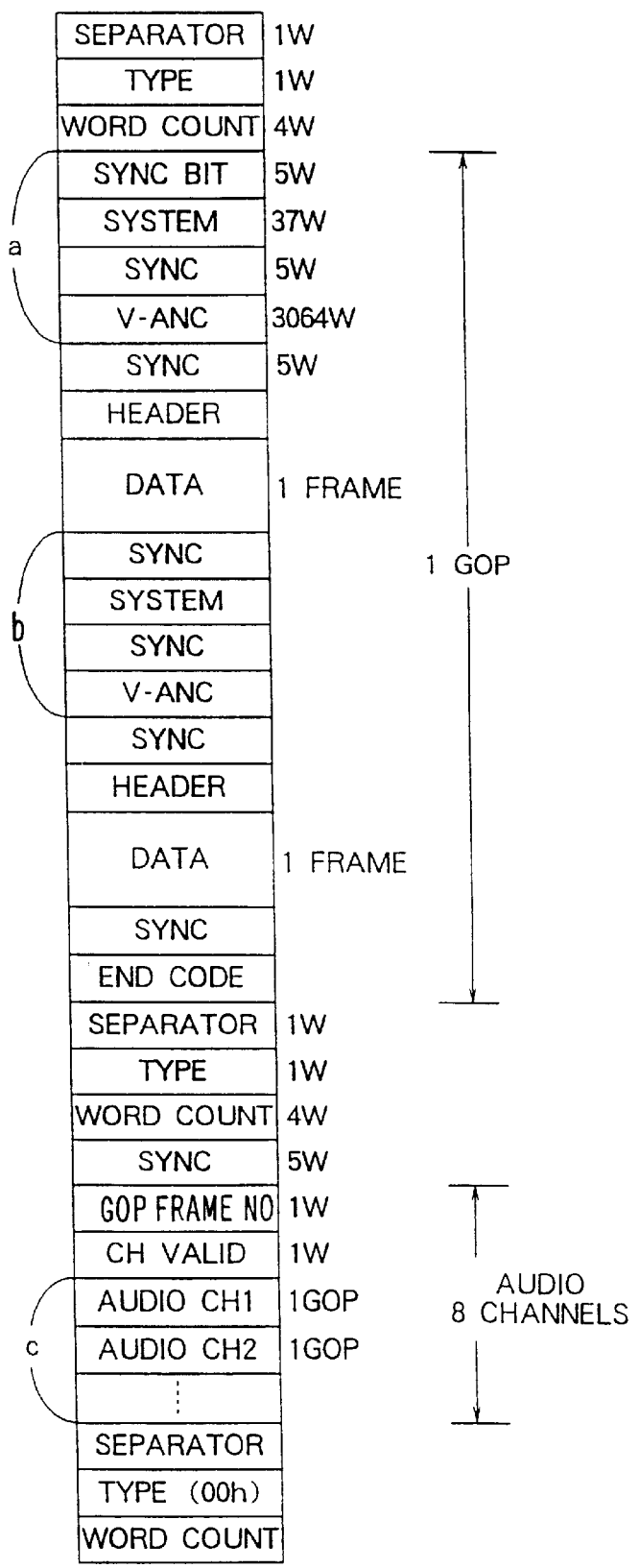
FIG. 4 is a view of an example of the data structure contained in the payload portion PAD of a transmission packet of the SDDI format.

FIG. 4 is a view illustrating the data structure of the video signal contained in the payload portion PAD of the transmission packet of the SDDI format shown in FIG. 3B.

Figure 5A:
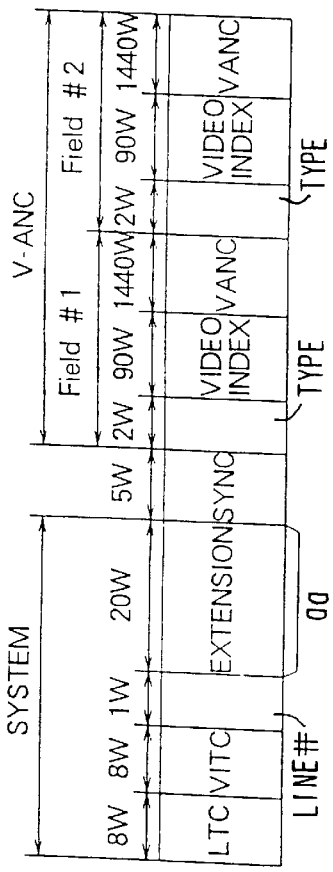
FIG. 5A is a view of the data contained in portions a and b contained in the payload portion PAD shown in FIG. 4.
Figure 5B:
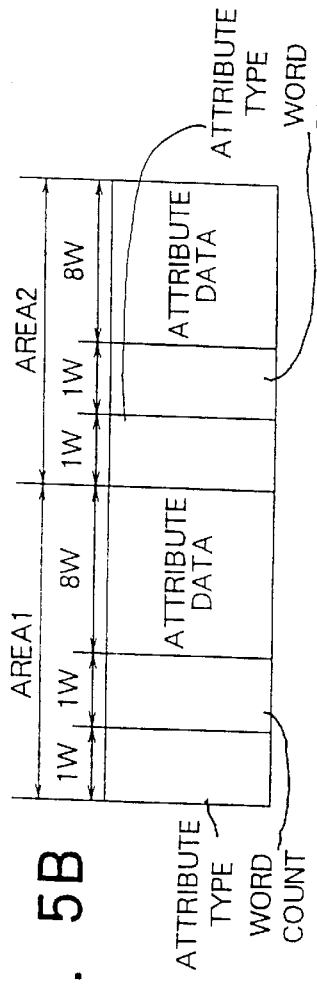
FIG. 5B is a view of the data contained in a portion aa (EXTENSION) shown in FIG. 5A.
Figure 5C:
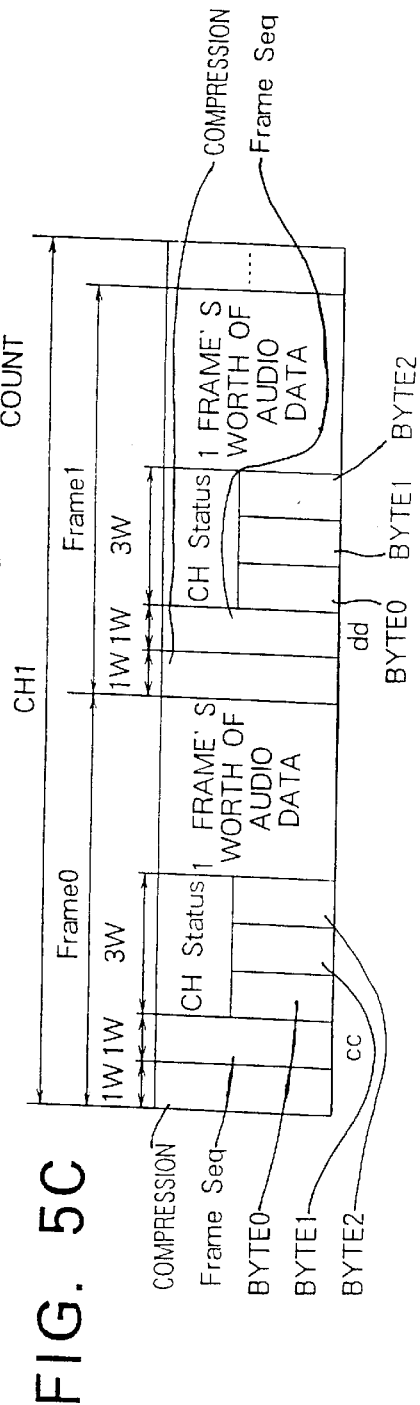
FIG. 5C is a view of the data contained in a portion c shown in FIG. 4.

FIG. 5A shows the data contained in the portions a and b of the payload portion PAD shown in FIG. 4; FIG. 5B shows the data contained in the portion aa (EXTENSION) shown in FIG. 5A; and FIG. 5C shows the data contained in the portion c shown in FIG. 4.

As shown in FIG. 4, the payload portion PAD of the transmission packet of the SDDI format is based on the following structure.

TABLE 2

Separator (SEPARATOR)
Type (TYPE)

Word count (WORD COUNT)
1 GOP
  a. Synchronization bit (SYNC BIT)
  a. System (SYSTEM)
  a. Synchronization data (SYNC)
  a. Ancillary data portion in vertical direction (V-ANC)
    Synchronization data (SYNC)
    Header (HEADER)
    Video data portion (VIDEO DATA)
  b. Synchronization data (SYNC BIT)
  b. System (SYSTEM)
  b. Synchronization data (SYNC)
  b. Ancillary data portion in vertical direction (V-ANC)
    Synchronization data (SYNC)
    Header (HEADER)
    Video data portion (VIDEO DATA)
  End code (END CODE)
  Separator (SEPARATOR)
  Type data (TYPE)
  Word count (WORD COUNT)
  Audio signal storage region
    Synchronization data (SYNC)
    Number of frames of GOP
    Channel valid (CH VALID)
    Audio data portion of 8 channels (AUDIO CH)

GOP (group of pictures) indicates frames having some mutual relationship in the case where inter-frame image compression based on the MPEG (Moving Picture Expert Group) has been carried out.

Further, at the end of the payload portion PAD, one part of the ancillary data portion ANC and a CRC code used for the error detection and error correction of the payload portion PAD part are added.

The separator is used as a sectioning code which divides into sections the different data such as the video signal, audio signal, etc.

The type data indicates the type of data to be stored in the video data portion. For example, where the video signal contained in the video data portion and the audio data portion is compressed, it indicates the compression method thereof (MPEG etc.), and where the video signal has not been compressed, it indicates this fact, or where data for a computer is contained in the payload portion PAD, it indicates this fact.

The word count indicates the length of that data.

The synchronization data (SYNC) is used for establishing synchronization when reproducing the video signal.

The system data is data indicating similar content to the attribute data shown in FIG. 5B.

The header is data for the signal compression and indicates for example the type of frame (B/frame/P frame/I frame, etc. in the MPEG system) or the number of the frames.

The data of the portions a and b shown in FIG. 4 are shown in FIG. 5A. As the extension (EXTENSION) data shown in a portion aa of FIG. 5A, the attribute data (ATTRIBUTE DATA) shown in FIG. 5B is contained. In the attribute data, data identified by the attribute type (ATTRIBUTE TYPE), for example, data indicating the date of a video signal, the name of the reporter or superintendent, and the setting of the music scene are contained.

In FIG. 5A, the LTC (Longitudinal Time Code) data shows a number indicating the video position on the video tape which is used in the case of the editing work etc. by time and is recorded in the audio line in the video tape.

In FIG. 5A, the VITC (Vertical Internal Time Code) data shows a number indicating the video position on the video tape which is used in the case of the editing work etc. by time and is recorded in the video line in the video tape.

In FIG. 5A, the video index (VIDEO INDEX) data shows information concerning the video signal, for example, information of the color frame.

In FIG. 5A, the VANC data indicates the data to be used by the user.

Further, a portion c of FIG. 4 becomes the content as shown in FIG. 5C. The respectively corresponding two left and right (8 channels at maximum) audio data (AUDIO DATA) are contained in frames 0 and 1 of the channel (CH1), and compression data indicating whether or not the corresponding audio data has been compressed, a channel status (CH Status) indicating the state of that channel or the sample frequency, etc. and a frame sequence (Frame. Seq.) data are contained.

In the frame for transmission of the above SDDI format, other than the data given the same names as the data according to the present invention, the frame for transmission of the SDI format means the first transmission frame according to the present invention; the separation codes SAV and EAV mean the separation code according to the present invention; the data ID code means the packet identification data according to the present invention; the block type means the structural data according to the present invention; the separator means the sectioning code according to the present invention; the type data means the type data according to the present invention; and the transmission frame of the SDDI format means the second transmission frame according to the present invention.

Common points of the SDI format and SDDI format

The length of the lines, frame structure, and data transmission speed of the SDI format and SDDI format are made the same and further commonality is imparted to the transmission packet of the SDI format and the transmission packet of the SDDI format. As a result, in the input side routing apparatus 20 and output side routing apparatus 40 shown in FIG. 6 and FIG. 7 mentioned later, the routing processing can be carried out by regarding these data as the same data.

As shown in FIG. 2B, each line of the video signal of the SDDI format is composed by 10 bits×1724 (1716) words per line in the horizontal direction and 525 (625) lines in the vertical direction similar to the lines of the video signal of the SDI format and contains the separation codes SAV and EAV, ancillary data portion ANC, and payload portion PAD (data portion DT) respectively corresponding to the codes SAV and EAV, ancillary data portion ANC, and active video portions $ACV_1$ and $ACV_2$ of the SDI format.

Both of the signal of the SDI format and the signal of SDDI format are converted to transmission signals of a serial format of 270 Mbps for transfer. Accordingly, signal processing can be carried out at the same speed.

Difference between SDI format and SDDI format

In the SDI format, the audio signal is stored in the ancillary data portion ANC, but in the SDDI format, unlike the SDI format, the audio signal is not contained in the ancillary data portion ANC, but the audio signal and video signal are stored in the payload part.

In the frame of a signal of the SDDI format, no part corresponding to the vertical blanking portion VBK of the SDI video signal is contained.

First embodiment

The structure of the digital data transmission apparatus 1 of the present invention will be explained referring to FIG. 6 to FIG. 7.

Figure 6:
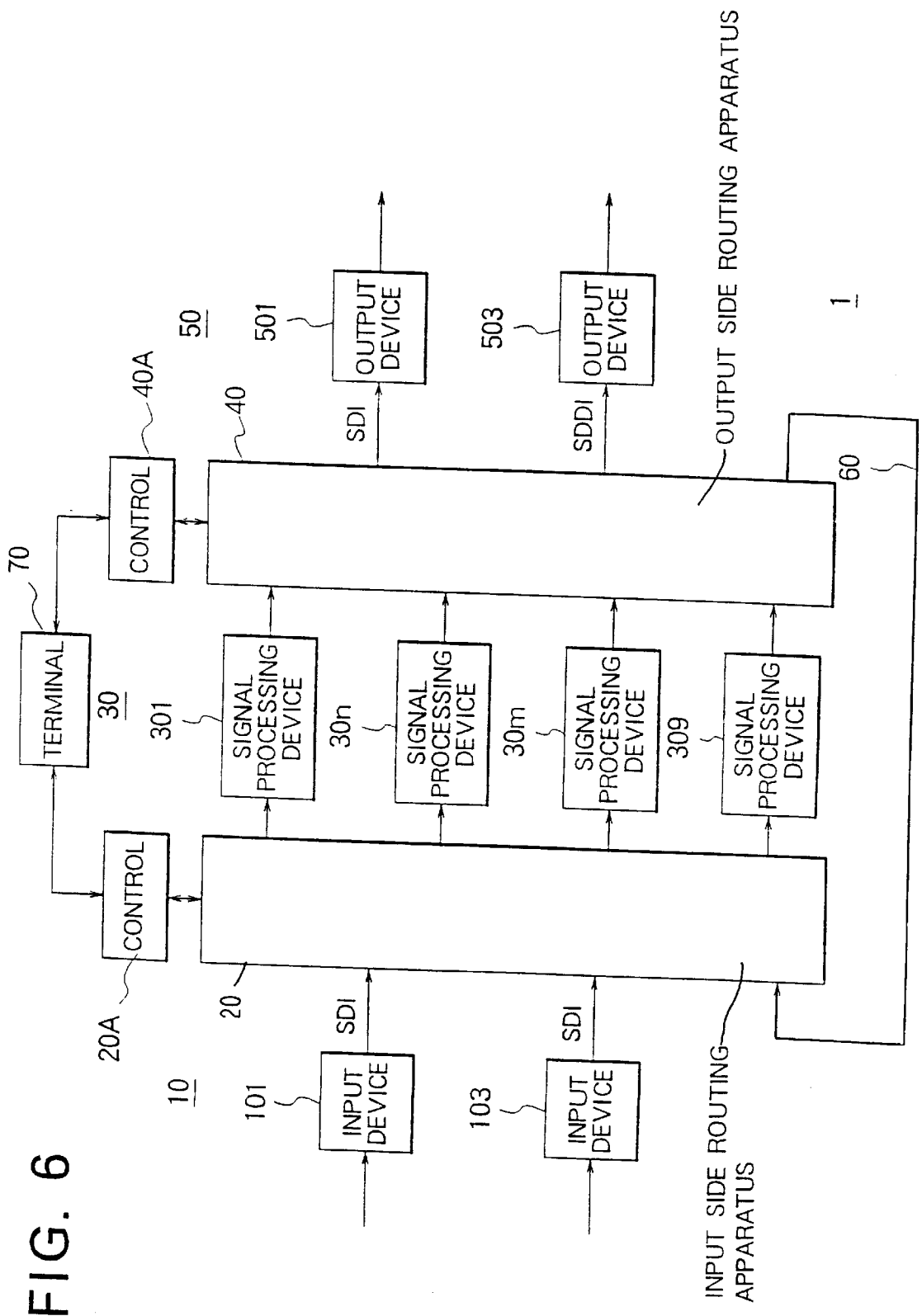
FIG. 6 is a view of the overall structure of a digital data transmission apparatus of the present invention.

FIG. 6 is a view of the overall structure of a digital data transmission apparatus 1 of the present invention.

The digital data transmission apparatus 1 comprises a group 10 of input devices, an input side routing apparatus (or input side router) 20, an input side routing control device (or input side router control device) 20A, a group 30 of audio-visual signal processing devices, output side routing apparatus (or output side router) 40, an output side routing control device (or output side router control device) 40A, group 50 of output devices, a signal route 60, and a terminal 70.

The group 10 of input devices comprises a first input device 101 outputting the data of the SDI format to the input side routing apparatus 20 and a second input device 103 outputting the data of the SDDI format.

The group 30 of the audio-visual signal processing devices comprises a plurality of audio-visual signal processing devices 301 to 309. As the audio-visual signal processing devices 301 to 309, various devices such as an editing device, a device for conversion from a signal of the SDI format to a signal of the SDDI format, a device for conversion from a signal of the SDDI format to a signal of the SDI format, a video tape recording and reproducing device (VTR), a magneto-optic disk device (MO), a hard disk device (HDD), etc. can be considered.

The group 50 of output devices comprises a first receiving device 501 which receives the signal of the SDI format which is output from the output side routing apparatus 40 and a second receiving device 503 which receives the signal of the SDDI format.

Information for the routing control of the input side routing apparatus 20 is set in the input side routing control device 20A from the terminal 70. The input side routing apparatus 20 performs the routing processing of the signal of the SDI format and the signal of the SDDI format input from the first input device 101 and the second input device 103 based on the routing control information from the input side routing control device 20A and outputs the resultant signal to the output terminal to which either of a plurality of audio-visual signal processing devices 301 to 309 is connected.

The output side routing control device 40A is set with routing control information for the routing control of the output side routing apparatus 40 from the terminal 70. The output side routing apparatus 40 performs the routing processing of the signal supplied to the output side routing apparatus 40 from either of a plurality of audio-visual signal processing devices 301 to 309 based on the routing control information from the output side routing control apparatus 40A and outputs the resultant data to the output terminal to which the first receiving device 501 or the second receiving device 503 is connected.

The signal route 60 connects the output terminal of the output side routing apparatus 40 and the input terminal of the input side routing apparatus 20.

A simple explanation will be given next of the operation of the digital data transmission apparatus 1 illustrated in FIG. 6. Note that, in the following description, a video signal of the NTSC system will be explained.

In the input side routing apparatus 20, the signal of the SDI format is supplied from the first input device 101 and the signal of the SDDI format is supplied from the second input device 103. In this way, the SDI format signal and SDDI format signal are simultaneously supplied to the input side routing apparatus 20, but as mentioned above, the SDI format signal and the SDDI format signal are the same in length of data of the lines, frame structure, and data transmission speed and the transmission packet of the SDI format signal and the transmission packet of the SDDI format signal are common, therefore also the SDDI format signal can be subjected to the routing processing by using the already existing input side routing apparatus 20 by regarding the same as the same data as the SDI format signal. This routing processing is carried out based on the routing control data set in the input side router control device 20A in advance from the terminal 70. In the present embodiment, it is assumed that the input side routing apparatus 20 is provided with a switching circuit, and the switching control (routing control) of that switching circuit is carried out by the input side router control device 20A.

The result routed by the input side routing apparatus 20 is output from the output terminal of the input side routing apparatus 20 and input to any of the audio-visual signal processing devices 301 to 309 of the group 30 of audio-visual signal processing devices connected to that output terminal.

Also the signal of the SDI format or the signal of the SDDI format from the plurality of audio-visual signal processing devices 301 to 309 of the group 30 of audio-visual signal processing devices is supplied to the output side routing apparatus 40, where the routing processing is carried out by controlling the output side routing apparatus 40 by the output side router control device 40A based on the routing control data preliminarily set by the terminal 70. In the present embodiment, it is assumed that the output side routing apparatus 40 is provided with a switching circuit, and the switching control (routing control) of that switching circuit is carried out by the output side router control device 40A.

Where the output signal of the output side routing apparatus 40 is a signal of the SDI format, it is output to the first receiving device 501, and where it is an SDDI signal, it is output to the second receiving device 503.

Note that, a signal route 60 is provided between the output side routing apparatus 40 and the input side routing apparatus 20, therefore it is possible to perform routing processing of for example a signal of the SDI format and signal of the SDDI format input from the first input device 101 and the second input device 103 via the input side routing apparatus 20, output the same to the audio-visual signal processing device 30$n$, input the result edited by the audio-visual signal processing device 30$n$ to the output side routing apparatus 40, perform the routing processing so that it is linked to the signal route 60 by the output side routing apparatus 40, return the same again to the input side routing apparatus 20, perform the routing processing there, and input the result thereof to the audio-visual signal processing device 30$m$. That is, for example, the result obtained by performing the signal processing (editing) by the audio-visual signal processing device 30$n$ can be further subjected to signal processing (editing) by the audio-visual signal processing device 30$m$.

Figure 7:
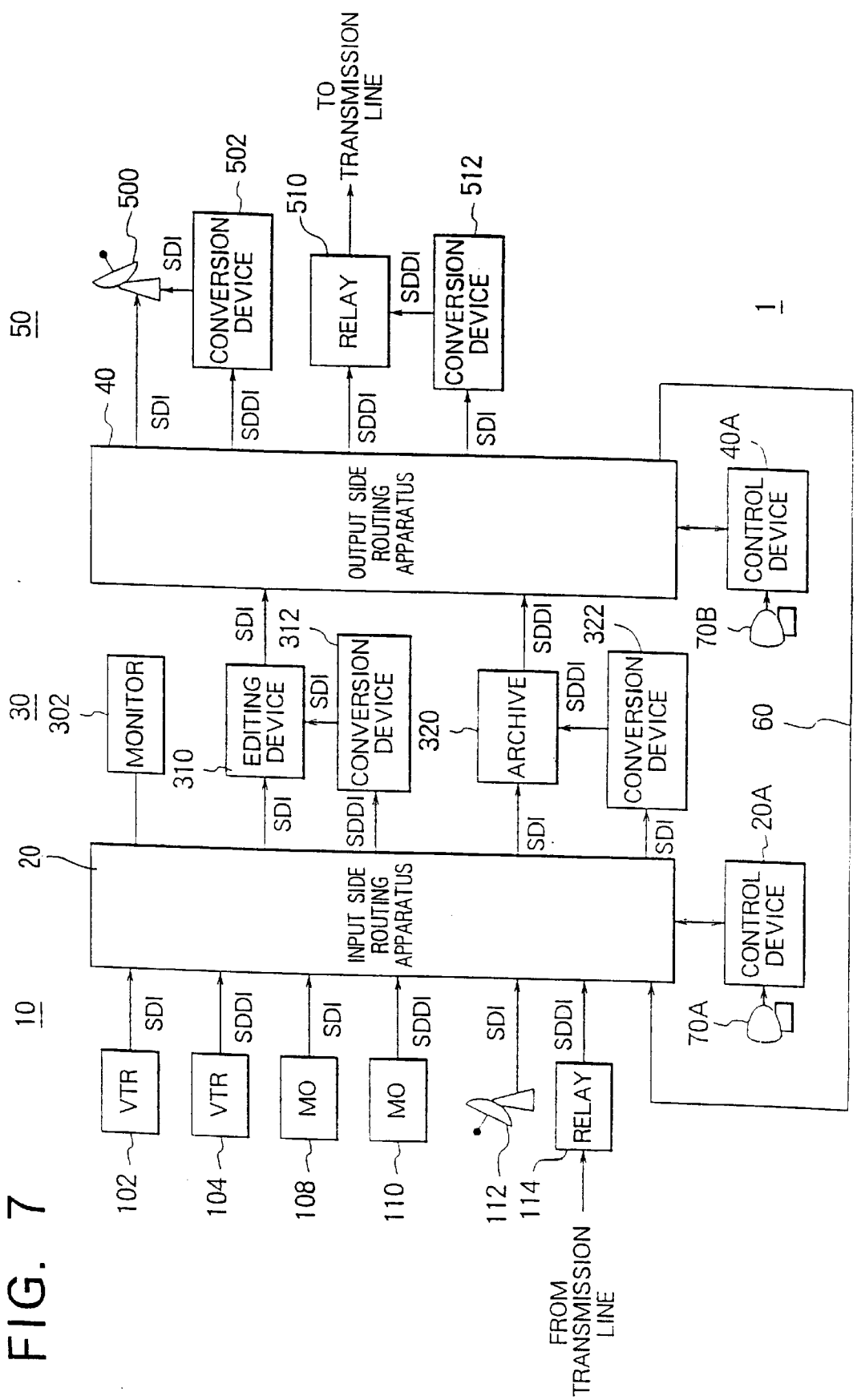
FIG. 7 is a detailed structural view of an input side routing apparatus, group of audio-visual signal processing devices, and output side routing apparatus shown in FIG. 6.

FIG. 7 shows a more detailed example of the structure of the digital data transmission apparatus 1 shown in FIG. 6.

The input device group 10 is constituted by a VTR 102, VTR 104, a magneto-optic disk (MO) device 108, an MO device 110, a wireless relaying and receiving device 112, and a wired relaying and receiving device 114.

The VTR 102 and the MO device 108 respectively reproduce a non-compressed video signal of for example the DI format recorded on the video tape and the magneto-optic disk and output the result as a video signal of the SDI format to the input side routing apparatus 20.

The VTR 104 and the MO device 110 respectively reproduce a non-compressed video signal of for example the DI format recorded on the video tape and the magneto-optic disk or the video signal compressed by the MPEG system and output the result as a video signal of the SDDI format to the input side routing apparatus 20.

The wireless relaying and receiving device 112 receives the video signal transmitted via a wireless communication line and outputs the same as a video signal of the SDI format to the input side routing apparatus 20.

The wired relaying and receiving device 114 receives the video signal transmitted via a wired communication line and outputs the same as a video signal of SDDI format to the input side routing apparatus 20.

The input side router control device 20A is connected to the input side routing apparatus 20, and routing information is set in the input side router control device 20A from the terminal 70A for the input routing apparatus according to the indication of the operator. The input side routing apparatus 20 performs the routing processing based on the routing information set by the terminal 70A for the input side routing apparatus.

The concept of the routing processing (switching processing) in the input side routing apparatus 20 will be explained by using FIG. 8. The input side routing apparatus 20 acts as one type of a cross point switch connecting the devices 102, 104, 108, 110, 112, and 114 of the group 10 of input device and the devices 302, 310, 312, 320, and 322 of the group 30 of the audio-visual signal processing devices. In the example illustrated in FIG. 8, it operates as 16×16 cross point switches. The signal supplied to the input terminal for the SDI format signal or the input terminal for the SDDI format signal is output from the output terminal for the SDI format signal or the output terminal for the SDDI format signal according to the control of the input side router control device 20A.

Figure 8:
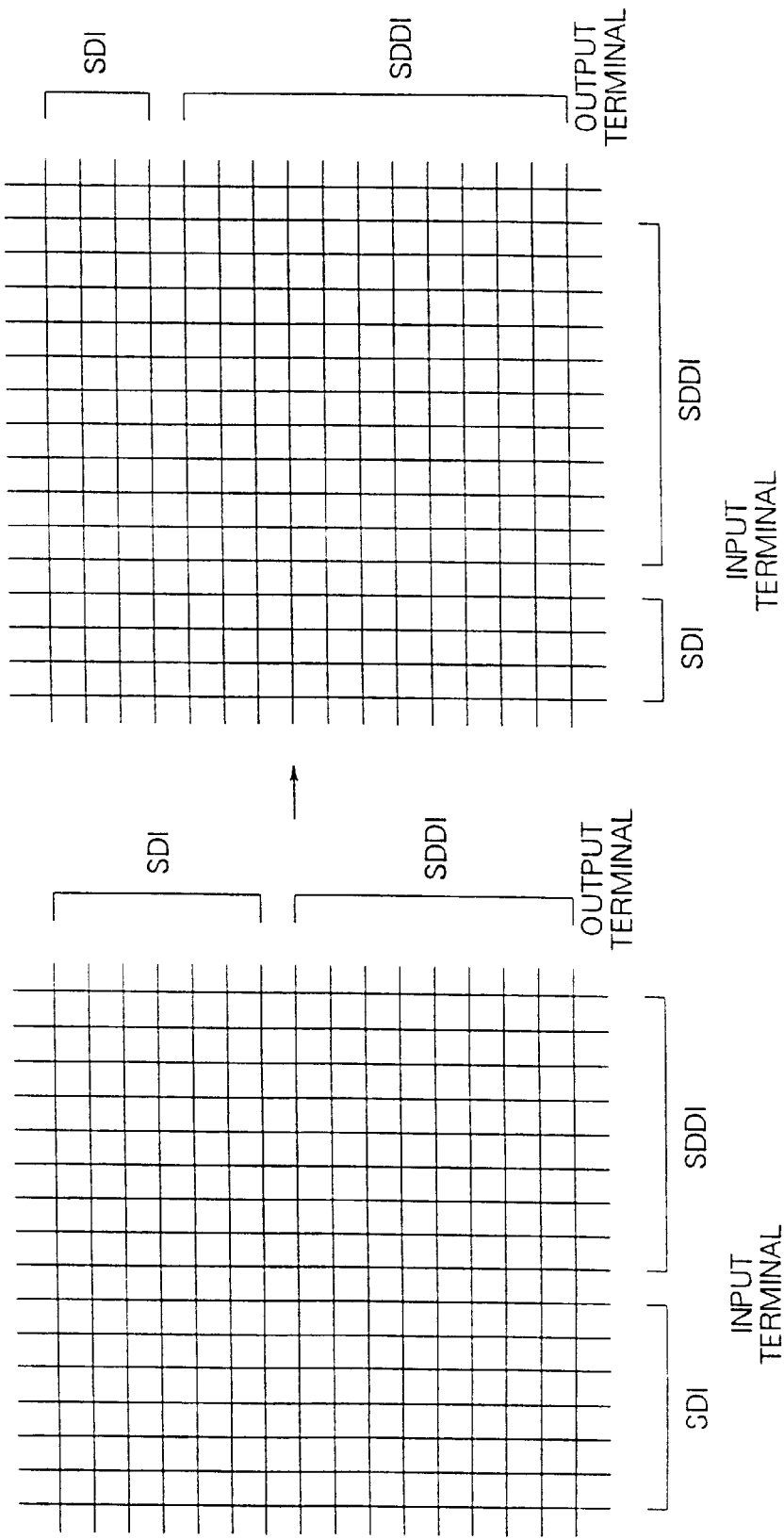
FIG. 8 is a view of the concept of operation of the input side routing apparatus shown in FIG. 7.

The example at the left in FIG. 8 shows a case wherein seven input terminals are provided for the SDI format signal and nine input terminals are provided for the SDDI format signal and seven output terminals are provided for the SDI format signal and nine output terminals are provided for the SDDI format signal. Here, as mentioned above, the SDI format signal and the SDDI format signal can use the same routing apparatus (input side routing apparatus 20), therefore by changing the table of the input side routing control device 20A, as illustrated at the right in FIG. 8, the proportion of the signals of the SDI format and signals of the SDDI format can be changed. For this reason, it is easy to cope with the addition and change of the apparatus handling the signals of the SDI format and the apparatus handling the signals of the SDDI format.

Note that, it is possible to integrally form the input side routing apparatus 20 and input side routing control device 20A and constitute them as the input side routing apparatus.

The group 30 of audio-visual signal processing devices is constituted by a TV monitor 302, an editing device 310, a conversion device 312, an archive storage device 320, and a conversion device 322.

The editing device 310 is a video editing device corresponding to the SDI format, edits a video signal of the SDI format input via the input side routing apparatus 20 and conversion device 312, and outputs the same to the output side routing apparatus 40.

The conversion device 312 is a device performing signal conversion from a signal of the SDDI format shown in FIG. 2 to FIG. 4 to a signal of the SDI format shown in FIG. 1. The circuit structure thereof is shown in FIG. 9.

Figure 9:
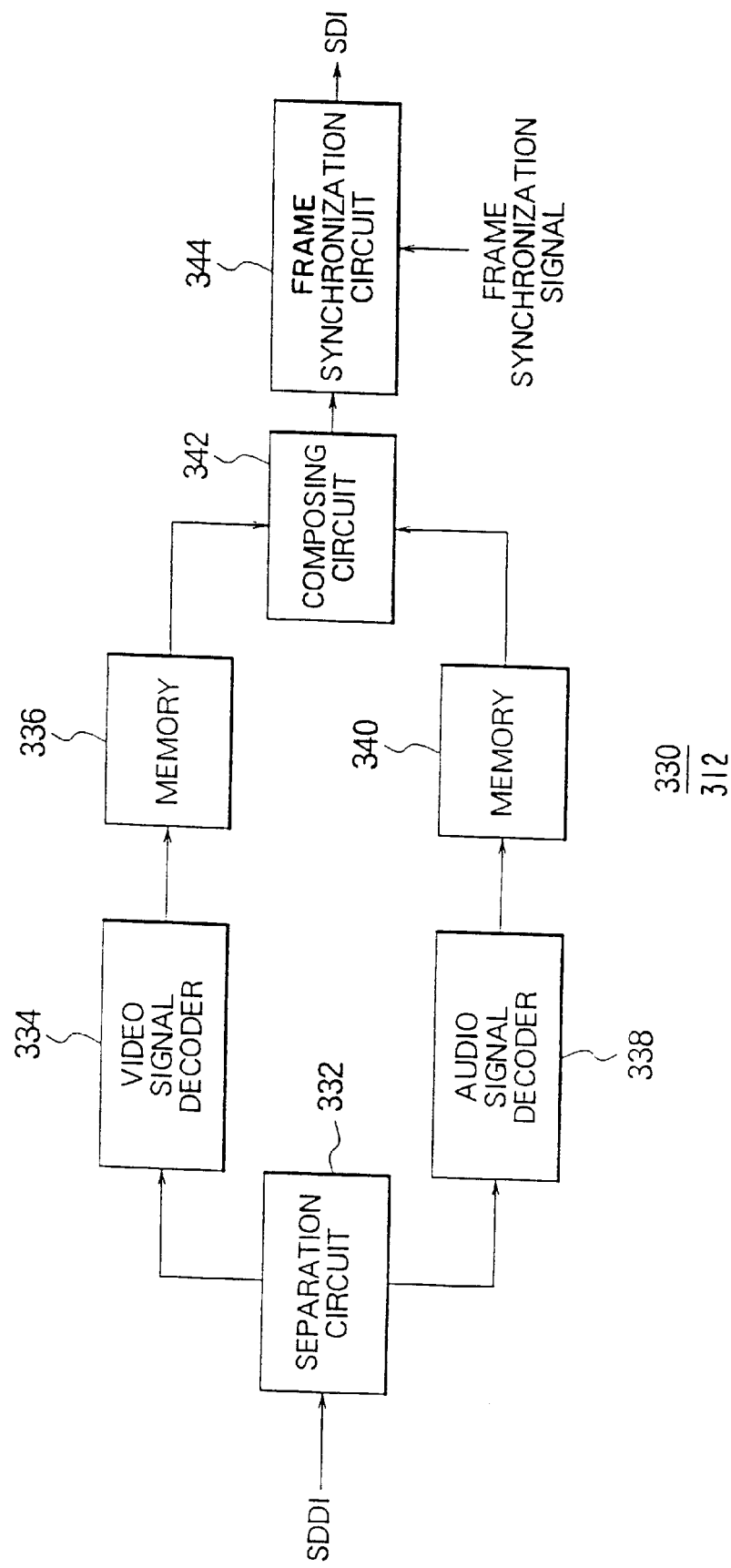
FIG. 9 is a structural view of a conversion device.

The SDDI-SDI conversion circuit 330 shown in FIG. 9 has a separation circuit 332 which separates the video signal and audio signal contained in the payload portion PAD of the signal of the SDDI format shown in FIG. 3; a video signal decoder 334 which decodes the separated video signal; a memory 336 for storing the result of this decoding; an audio signal decoder 338 which decodes the separated audio signal; a memory 340 which stores the result of this decoding; a composition circuit 342 which composes the decoded video signal and audio signal by the SDI format; and a frame synchronization circuit 344 which synchronizes the composed signal with the signal of the SDI format in units of frames by using the frame synchronization signal. The video signal decoder 334 and the audio signal decoder 338 decode the video signal and audio signal according to for example the MPEG. The memory 336 and the memory 340 are buffers for matching the timings of the two decoded signals. In the SDDI format, both of the video signal and audio signal are stored in the payload portion PAD, but in the SDI format, the audio signal is stored in the ancillary data portion ANC.

The archive storage device 320 records and stores the video signal input from the input side routing apparatus 20 and the conversion device 322 in a recording medium such as a video tape and reproduces and outputs the recorded video signal to the output side routing apparatus 40 according to need.

The conversion device 322 is a device performing the signal conversion from a signal of the SDI format of the format shown in FIG. 1 to a signal of the SDDI format of the format shown in FIG. 2 to FIG. 3. It outputs the converted signal to the archive storage device 320. The circuit structure of this signal conversion device becomes similar to the circuit structure shown in FIG. 9, but in the SDI format, based on the fact that the audio signal is stored in the ancillary data portion ANC and the video signal is stored in the active video portion ACV, they are separated, the separated video signal and audio signal are decoded by the video signal decoder and the audio signal decoder, respectively, the timing is matched by the memory, the decoded video signal and audio signal are composed in accordance with the SDDI format, frame synchronization processing is carried out, and the resultant signal is output.

The TV monitor 302 is a video monitor corresponding to both of the SDI format signal and SDDI format signal and displays a video based on the video signal which passes through the signal route 60 from any device of the group 10 of input devices or output side routing apparatus 40, is input to the input side routing apparatus 20, subjected to the routing processing, and output. The internal circuit of the TV monitor 302 is shown in FIG. 10.

Figure 10:
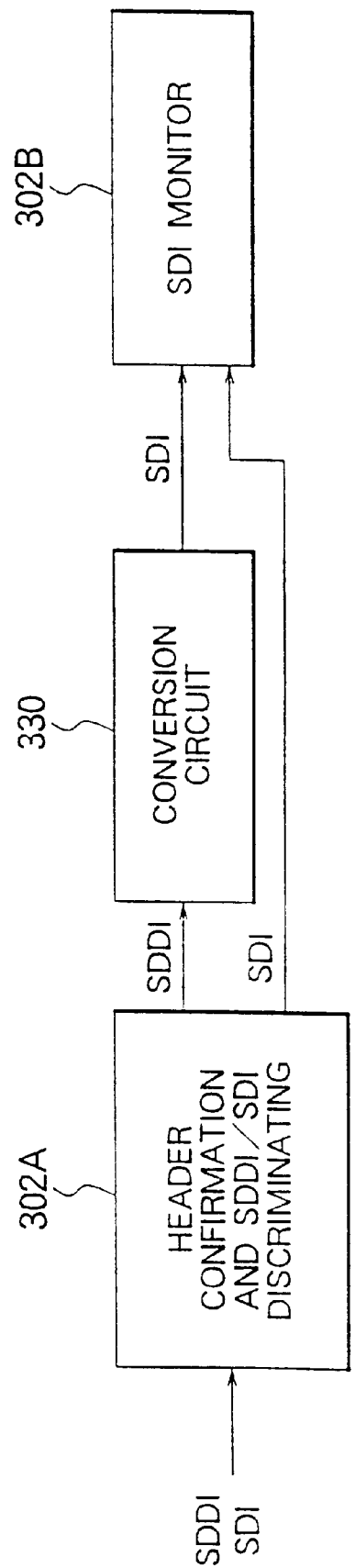
FIG. 10 is a structural view of a circuit to be installed in a TV monitor shown in FIG. 6.

In a discrimination circuit 302A of FIG. 10, the data ID code contained in the header of the input signal is confirmed and the signal of SDDI format and the signal of SDI format are discriminated. Where the input signal is a signal of the SDDI format, it is supplied to the SDDI-SDI conversion circuit 330 shown in FIG. 9, converted to the signal of the SDI format, and output to the SDI monitor circuit 302B. Where the input signal is a signal of the SDI format, it is directly supplied to the SDI monitor circuit 302B.

By installing the circuit shown in FIG. 10 in the TV monitor 302, the signal of SDI format and the signal of SDDI format are set by the same EAV and SAV conditions (position interval), therefore even if either of the signal of the SDI format or the signal of the SDDI format is supplied, the video can be confirmed. Also, even if the TV monitor 302 can handle only a signal of the SDI format unlike the monitor shown in FIG. 10, the signal of the SDI format is displayed on the SDI monitor as it is, the signal of the SDDI format is displayed as a pattern of black and white spots, and, where no signal exists, noise-full picture video is displayed. In this way, by observing the video displayed on the TV monitor, it can be decided whether a signal of the SDI format is supplied or a signal of the SDDI format is supplied.

The output side routing apparatus 40 controls the routing of the output side routing apparatus 40 according to the routing information set by the operator via the terminal 70B for the output side routing apparatus. The routing operation of the output side routing apparatus 40 and the change of the signal of SDI format and signal of SDDI format are similar to those of the input side routing apparatus 20 mentioned by referring to FIG. 8. That is, the output side routing apparatus 40 operates as a type of cross point switch connecting the devices of the group 30 of audio-visual signal processing devices and the devices of the group 50 of output devices similar to the input side routing apparatus 20.

A part of the output signals of the output side routing apparatus 40 returns again to the input side routing apparatus 20 via the signal route 60, and the video signal output by for example the editing device 310 can be input to the archive storage device 320. The group 50 of output devices comprises a wireless relaying and transmitting device 500, conversion devices 502 and 512, and a wired relaying and transmitting device 510.

The wireless relaying and transmitting device 500 transmits a video signal of the SDI format input from the output side routing apparatus 40 to the wireless communication line.

The conversion device 502 includes the conversion circuit 330 illustrated in FIG. 9, converts a video signal of the SDDI format output from the output side routing apparatus 40 to a video signal of the SDI format, and outputs the same to the wired relaying and transmitting device 510.

The wired relaying and transmitting device 510 transmits a video signal of the SDDI format output from the output side routing apparatus 40 to the wired communication line.

The conversion device 512 includes a similar conversion circuit to the conversion device 322, converts a video signal of the SDI format output from the output Bide routing apparatus 40 to a signal of the SDDI format, and outputs the same to the wired relaying and transmitting device 510.

For example, the video signal of the SDI format output from the editing device 310 is directly output to the signal route 60 or the wireless relaying and transmitting device 500 via the input side routing apparatus 20 and transmitted onto the wireless line. Also, the video signal of the SDI format from the editing device 310 is converted to a video signal of the SDDI format by the conversion device 512 and input to the wired relaying and transmitting device 510 and transmitted onto the wired line. Also, the video signal of the SDDI format output from the archive storage device 320 is directly output to the signal route 60 or the wired relaying and transmitting data 510 via the input side routing apparatus 20 and transmitted onto the wired line. Also, the video SDI of the SDDI format from the archive storage device 320 is converted to the video signal of the SDI format by the conversion device 502, input to the wireless relaying and transmitting device 500, and transmitted onto the wireless line.

As mentioned above, by using the SDDI format having a commonality of format with the SDI format for the transmission of a video signal, the transmission of video signals among the devices of the editing device 310 of the digital data transmission apparatus 1 can be carried out by using the input side routing apparatus 20 and output side routing apparatus 40 performing the routing of the data by the exchange of the already existing transmission lines.

Also, by adding a conversion device which converts a video signal of the SDDI format to a video signal of the SDI format to the device processing the video signal of the SDI format or by adding a conversion device which converts a video signal of the SDDI format to a video signal of the SDI format to the device processing the video signal of the SDI format, the video signal can be commonly used between devices having different formats.

Also, for example, in the digital data transmission apparatus 1, it is also possible to gradually increase the proportion of the devices of the SDI format and finally replace all devices by the devices of the SDDI format. That is, it is possible to change all equipment of a broadcasting station etc. step by step to devices processing the SDDI format.

Also, the interchangeability among the SDI format and SDDI format is high, and therefore where for example the data structures of the same active video portion ACV and payload portion PAD portion are made the same, it is possible to display a video signal of the SDDI format on a monitor for the SDI format to an extent that a problem does not occur in practical use.

Second embodiment

Figure 11:
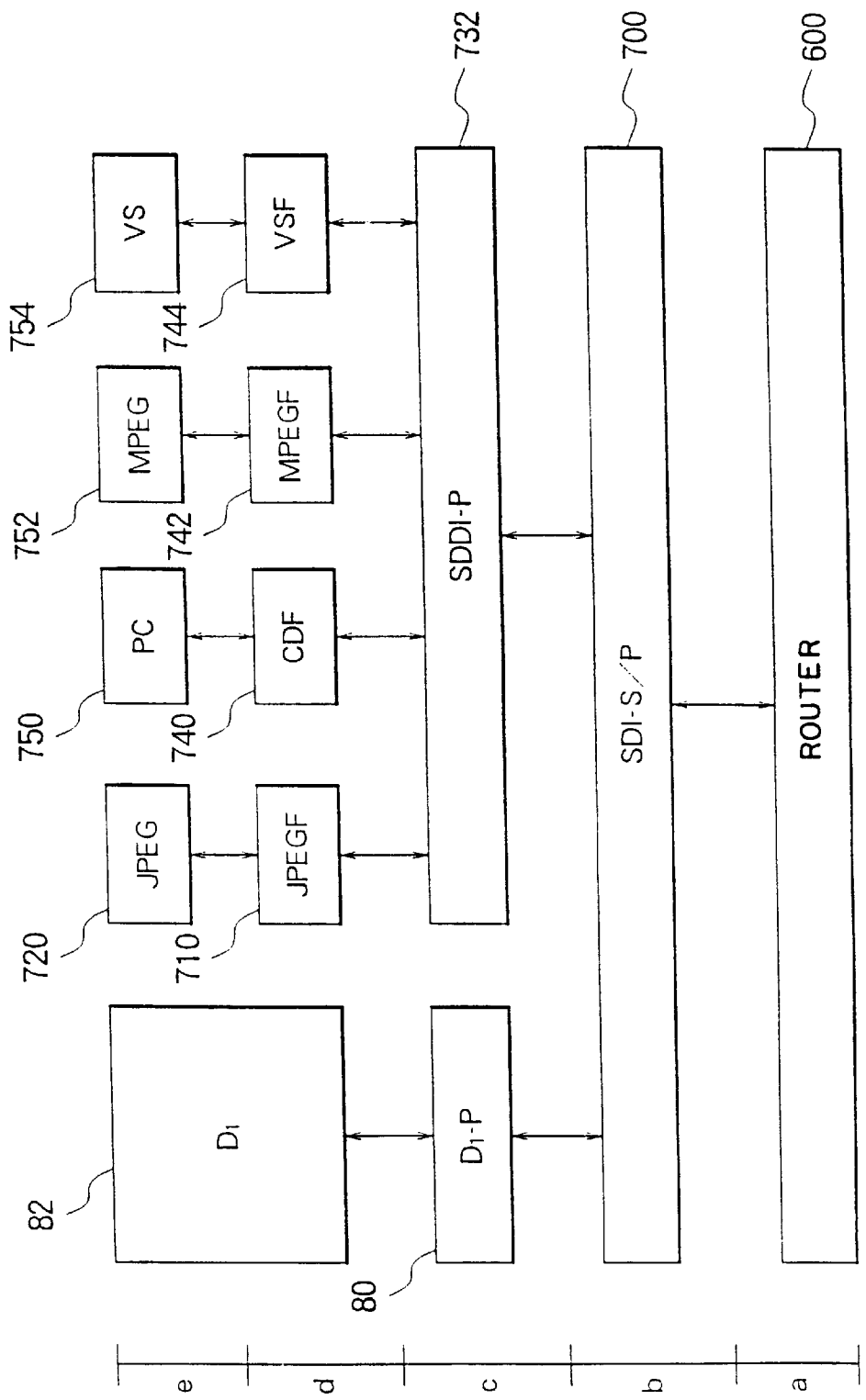
FIG. 11 is a view of the hierarchical structure of the digital data transmission apparatus of the present invention.

As shown in FIG. 11, the digital data transmission apparatus 1 of the present invention can constitute devices used for the data transmission as a hierarchy comprising devices of a transmission path a, physical layer b, SDDI layer c, adaptation layer d, and application layer e. That is, the part concerning the SDDI format of the digital data transmission apparatus 1 can be constituted by an apparatus given a hierarchy comprising: a router 600; a conversion device (SDI-S/P) 700 which converts a video signal of a serial form of the SDDI format input from the router 600 to a signal of the parallel form and performs reverse conversion to this; a packet device (SDDI-P) 732 which assembles or disassembles the transmission packet of the SDDI format; a packet device 732; and an editing device 720 for JPEG; a personal computer 750, an editing device 752 for MPEG; a JPEG formatter device 710 performing the interface with the video server system 754; a computer interface device 740; and a MPEG formatter device 742.

Note that, the SDDI format and the SDI format have interchangeability of the transmission speed etc., and therefore can commonly use the conversion device 700.

Further, it is also possible to mix a compressed video signal and a non-compressed video signal in the conversion device 700 by using a DI parallel interface 80 connecting the DI editing device 82 editing the video signal of the DI format which is not compressed and the conversion device 700.

Third embodiment

Other than the above embodiments, it is also possible to constitute the system so that the output terminal of the input side routing apparatus 20 and the output terminal of the output side routing apparatus 40 are directly connected by the conversion devices 502 and 512 and the conversion devices 502 and 512 are commonly used by the respective devices.

Modifications

The types or numbers of the devices shown in the embodiments are examples. It is also possible to replace the same by other types of devices or increase the number of the devices. Also, which devices adopt which of the SDI format or SDDI format is freely decided.

In FIG. 7, an example of separately providing the terminal 70A for the input routing apparatus and the terminal 70B for the output routing apparatus was shown, but it is also possible to integrally constitute the terminal 70A for the input routing apparatus and the terminal 70B for the output routing apparatus as the terminal 70 as shown in FIG. 6.

In the above embodiments, use is made of an apparatus of a form performing the routing by exchange of transmission lines as the input side routing apparatus 20 and the output side routing apparatus 40, but it is also possible to replace these apparatuses with apparatuses performing the routing by for example the ATM exchange system or the cumulative exchange system by actively using the destination data and data of the origination of the ancillary data portion ANC of the transmission packet of SDDI format.

Also, in the above embodiments, the digital data transmission apparatus 1 was applied to a video signal, but it is also possible to transmit other types of data, for example, computer data, by the transmission packet of the SDI format and SDDI format.

The digital data transmission apparatus of the present invention can adopt various structures other than those shown in for example the above modifications.

As mentioned above, according to the present invention, while more suited for multimedia and multi-channels than the SDI format, the transmission of a video signal etc. can be carried out by using a transmission system of the SDDI format having a high interchangeability with the SDI format.

Also, according to the present invention, the multimedia and multi-channel processing of broadcasts etc. can be realized by using a new transmission format, that is, the SDDI format, by using the routing apparatus of the already existing SDI format in the broadcasting station.

Further, according to the present invention, multimedia and multi-channel processing of broadcasts etc. can be realized at a low cost and in addition with little work by using the SDDI format.

According to the present invention, a data transmission apparatus using a transmission packet adapted to the ATM exchange system which is expected to become the mainstream of the transmission systems of digital signals in the future can be provided.

CAPABILITY OF EXPLOITATION IN INDUSTRY

A digital data transmission apparatus of the present invention can be applied to a digital AV editing device and a data transmission system.

We claim:

1. A digital data transfer apparatus comprising:
    transfer packet forming means for forming a first transfer packet including:
        a payload portion into which digital data is inserted;
        a first start synchronization code storage portion positioned at a preceding position of said payload portion into which a first start synchronization code is inserted, said first start synchronization code indicating a start of said digital data inserted into said payload portion;
        a first end synchronization code storage portion into which a first end synchronization code is inserted, said first end synchronization code indicating an end of said digital data inserted into said payload portion; and
        an ancillary data storage portion positioned between said first end synchronization code storage portion and said first start synchronization code storage portion and into which a data identification code is inserted;
    said payload portion, said first synchronization code storage portion, said first end synchronization code storage portion and said ancillary data storage portion respectively corresponding to the following portions constituting a second transfer packet of a serial data interface format, said second transfer packet including:
        an active video portion into which video data is inserted;
        a second start synchronization code storage portion positioned at a preceding portion of said active video portion into which a second start synchronization code is inserted, said second start synchronization code indicating a start of said video data inserted into said active video portion;
        a second end synchronization code storage portion into which a second end synchronization code is inserted, said second end synchronization code indicating an end of said video data inserted into said active video portion; and
        an auxiliary data storage portion positioned between said second end synchronization code storage portion and said second start synchronization code storage portion and into which auxiliary data is inserted, said data identification code inserted into said first ancillary data storage portion indicating a data grade of the data inserted into said payload portion whether the data is said serial data interface format data or not; and
    serial digital data transmitting means for transmitting serial data having said first transfer packet, translated in said transfer packet forming means.

2. A digital data serial transfer apparatus according to claim 1, wherein said serial data interface is defined by SMPTE-259M standard.

3. A digital data serial transfer apparatus according to claim 2, wherein said data identification code inserted into said first ancillary data storage portion indicates a data grade of which the digital data inserted into said payload is the data of said SMPTE-259M standard or the compressed video data.

4. A method for serially transferring digital data, including the steps of:
    forming a first transfer packet including:
        a payload portion into which digital data is inserted;
        a first start synchronization code storage portion positioned at a preceding position of said payload portion into which a first start synchronization code is inserted, said first start synchronization code indicating a start of said digital data inserted into said payload portion;
        a first end synchronization code storage portion into which a first end synchronization code is inserted, said first end synchronization code indicating an end of said digital data inserted into said payload portion; and
        an ancillary data storage portion positioned between said first end synchronization code storage portion and said first start synchronization code storage portion and into which a data identification code is inserted;
    said payload portion, said first synchronization code storage portion, said first end synchronization code storage portion and said ancillary data storage portion respectively corresponding to the following portions constituting a second transfer packet of a serial data interface format, said second transfer packet including:
        an active video portion into which video data is inserted;
        a second start synchronization code storage portion positioned at a preceding portion of said active video portion into which a second start synchronization code is inserted, said second start synchronization code indicating a start of said video data inserted into said active video portion;

a second end synchronization code storage portion into which a second end synchronization code is inserted, said second end synchronization code indicating an end of said video data inserted into said active video portion; and an auxiliary data storage portion positioned between said second end synchronization code storage portion and said second start synchronization code storage portion and into which auxiliary data is inserted, said data identification code inserted into said first ancillary data storage portion indicating a data grade of data inserted into said payload portion whether the data is said serial data interface format data or not; and transmitting serial digital data having said first transfer packet, translated in said forming step.

5. A method for serially transferring a digital data according to claim 4, wherein said serial data interface is defined by SMPTE-259M standard.

6. A method for serially transferring a digital data according to claim 5, wherein said data identification code inserted into said first ancillary data storage portion indicates a data grade of which the digital data inserted into said payload is the data of said SMPTE-259M standard or the compressed video data.

7. A digital data serial transfer apparatus comprising:

transfer packet forming means for forming a first transfer packet including:
a payload portion into which digital data is inserted;
a start synchronization code storage portion positioned at a preceding position into which a start synchronization code is inserted, said start synchronization code indicating a start of said digital data inserted into said payload portion;
an end synchronization code storage portion into which an end synchronization code is inserted, said end synchronization code indicating an end of said digital data inserted into said payload portion; and
an ancillary data storage portion positioned between said end synchronization code storage portion and said start synchronization code storage portion and into which a data identification code is inserted, said data identification code inserted into said ancillary data storage portion indicating a data grade of data inserted into said payload portion whether the data is digital video data or compressed digital video data; and serial data transfer means for transferring serial data having said transfer packet, translated in said transfer packet forming means.

8. A digital data serial transfer apparatus according to claim 7, wherein said digital video data inserted into said payload portion has a serial data interface of SMPTE-259M standard.

9. A digital data serial transfer apparatus according to claim 8, wherein the video data having a format of said serial data interface or compressed video data is inserted into said payload portion, and wherein said data identification code inserted into said ancillary data storage portion indicates a data grade whether the digital data inserted into said payload portion is the data of said SMPTE-259M standard or the compressed video data.

10. A method for serially transferring digital data, including the steps of:

forming a first transfer packet including:
a payload portion into which digital data is inserted;
a start synchronization code storage portion positioned at a preceding position into which a start synchronization code is inserted, said start synchronization code indicating a start of said digital data inserted into said payload portion;
an end synchronization code storage portion into which an end synchronization code is inserted, said end synchronization code indicating an end of said digital data inserted into said payload portion; and
an ancillary data storage portion positioned between said end synchronization code storage portion and said start synchronization code storage portion and into which a data identification code is inserted, said data identification code inserted into said ancillary data storage portion indicating a data grade whether the data inserted into said payload is digital video data or compressed digital video data; and transferring serial data having said transfer packet, translated in said forming step.

11. A method for serially transferring a digital data according to claim 10, wherein said digital video data inserted into said payload portion has a serial data interface of SMPTE-259M standard.

12. A method for serially transferring a digital data according to claim 11, wherein the video data having a format of said serial data interface or compressed video data is inserted into said payload portion, and wherein said data identification code inserted into said ancillary data storage portion indicates a data grade whether the digital data inserted into said payload portion is the data of said SMPTE-259M standard or the compressed video data.

* * * * *

UNITED STATES PATENT AND TRADEMARK OFFICE
CERTIFICATE OF CORRECTION

PATENT NO. : 6,002,455
DATED : Dec. 14, 1999
INVENTOR(S) : Enomoto et al.

It is certified that error appears in the above-identified patent and that said Letters Patent is hereby corrected as shown below:

Under [63]   Related U.S. Application Data

Continuation of application No. 08/624,560,
-- filed as application No. PCT/JP95/01615,
Aug. 14, 1995,-- Patent No. 5,721,883.

Signed and Sealed this

Twenty-fourth Day of April, 2001

Attest:

NICHOLAS P. GODICI

Attesting Officer    Acting Director of the United States Patent and Trademark Office